United States Patent
Mathai et al.

(10) Patent No.: US 9,354,410 B2
(45) Date of Patent: May 31, 2016

(54) MONOLITHICALLY INTEGRATED, SELF-ALIGNING, OPTICAL-FIBER FERRULE

(75) Inventors: Sagi Varghese Mathai, Berkeley, CA (US); Michael Renne Ty Tan, Menlo Park, CA (US); Paul Kessler Rosenberg, Sunnyvale, CA (US); Wayne Victor Sorin, Mountain View, CA (US); Georgios Panotopoulos, Berkeley, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/365,194

(22) PCT Filed: Jan. 31, 2012

(86) PCT No.: PCT/US2012/023226
§ 371 (c)(1),
(2), (4) Date: Jun. 13, 2014

(87) PCT Pub. No.: WO2013/115782
PCT Pub. Date: Aug. 8, 2013

(65) Prior Publication Data
US 2015/0003792 A1     Jan. 1, 2015

(51) Int. Cl.
*G02B 6/42* (2006.01)
*G02B 6/43* (2006.01)

(52) U.S. Cl.
CPC .............. *G02B 6/4293* (2013.01); *G02B 6/423* (2013.01); *G02B 6/4232* (2013.01); *G02B 6/4285* (2013.01); *G02B 6/43* (2013.01)

(58) Field of Classification Search
None
See application file for complete search history.

(56) References Cited

U.S. PATENT DOCUMENTS

| 5,434,939 | A  | 7/1995 | Matsude |
| 6,527,456 | B1 | 3/2003 | Trezza |
| 6,626,585 | B1 | 9/2003 | Malone |
| 7,198,412 | B2 | 4/2007 | Hamasaki et al. |
| 7,347,632 | B2 | 3/2008 | Farr |
| 7,483,470 | B2 | 1/2009 | Nagashima et al. |

(Continued)

FOREIGN PATENT DOCUMENTS

| JP | 2001124959 | 5/2001 |
| KR | 10-20030088249 | 11/2003 |

(Continued)

OTHER PUBLICATIONS

International Search Report and Written Opinion, Oct. 29, 2012, PCT Patent Application No. PCT/US2012/023226, 10 pages.

*Primary Examiner* — Jerry Rahll
(74) *Attorney, Agent, or Firm* — Wagner Blecher LLP

(57) ABSTRACT

A monolithically integrated, self-aligning, optical-fiber ferrule for a pigtailed opto-electronic module. The ferrule includes a body, a cavity defined within the body, a lateral alignment structure, and an optical-fiber stop. The cavity is to accept and align an optical fiber with an end of the cavity to face an optical aperture of an opto-electronic component. The lateral alignment structure is to self-align laterally the optical fiber with the optical aperture. The optical-fiber stop is coupled to the body, to self-align vertically the optical fiber. The body, the cavity, the lateral alignment structure and the optical-fiber stop are integrated together as a portion of a monolithically integrated chip. A system and a pigtailed opto-electronic engine that include the ferrule are also provided.

20 Claims, 10 Drawing Sheets

(56) References Cited

U.S. PATENT DOCUMENTS

2003/0235227 A1 12/2003 Chand et al.
2008/0193142 A1 8/2008 Kopp et al.

FOREIGN PATENT DOCUMENTS

| KR | 20030088249 A | 11/2003 |
| TW | I316617 B | 11/2009 |
| WO | WO-2012096651 A1 | 7/2012 |

MONOLITHICALLY INTEGRATED, SELF-ALIGNING, OPTICAL-FIBER FERRULE

RELATED APPLICATIONS

This application is related to PCT Patent Application, Serial Number PCT/US2011/020785 by Michael Renne Ty Tan, et al., filed on Jan. 11, 2011, entitled "PASSIVE OPTICAL ALIGNMENT," and assigned to the assignee of the present technology.

TECHNICAL FIELD

Examples of the present technology relate generally to optical-fiber ferrules and opto-electronic engines.

BACKGROUND

As the band-width in data processing and communications grows, engineers and scientists engaged in data-systems design have turned with increasing interest to optical fibers as a means for providing data processing and communications with high band-width. Thus, vertical-cavity, surface-emitting lasers (VCSELs) and photo-diodes (PDs) coupled to such optical fibers in arrays of optical transmitters and optical receivers, respectively, are finding increasing application as means for providing high band-width data processing and communication. Thus, as engineers and scientists have become more engaged in research and development of systems utilizing such optical fibers, VCSELs and PDs, their attention has increasingly turned towards designing such systems with high reliability and low cost, to meet the increasing challenges presented by data processing and communications at high band-widths.

DESCRIPTION OF THE DRAWINGS

The accompanying drawings, which are incorporated in and form a part of this specification, illustrate examples of the technology and, together with the description, serve to explain the examples of the technology.

Figure 1:
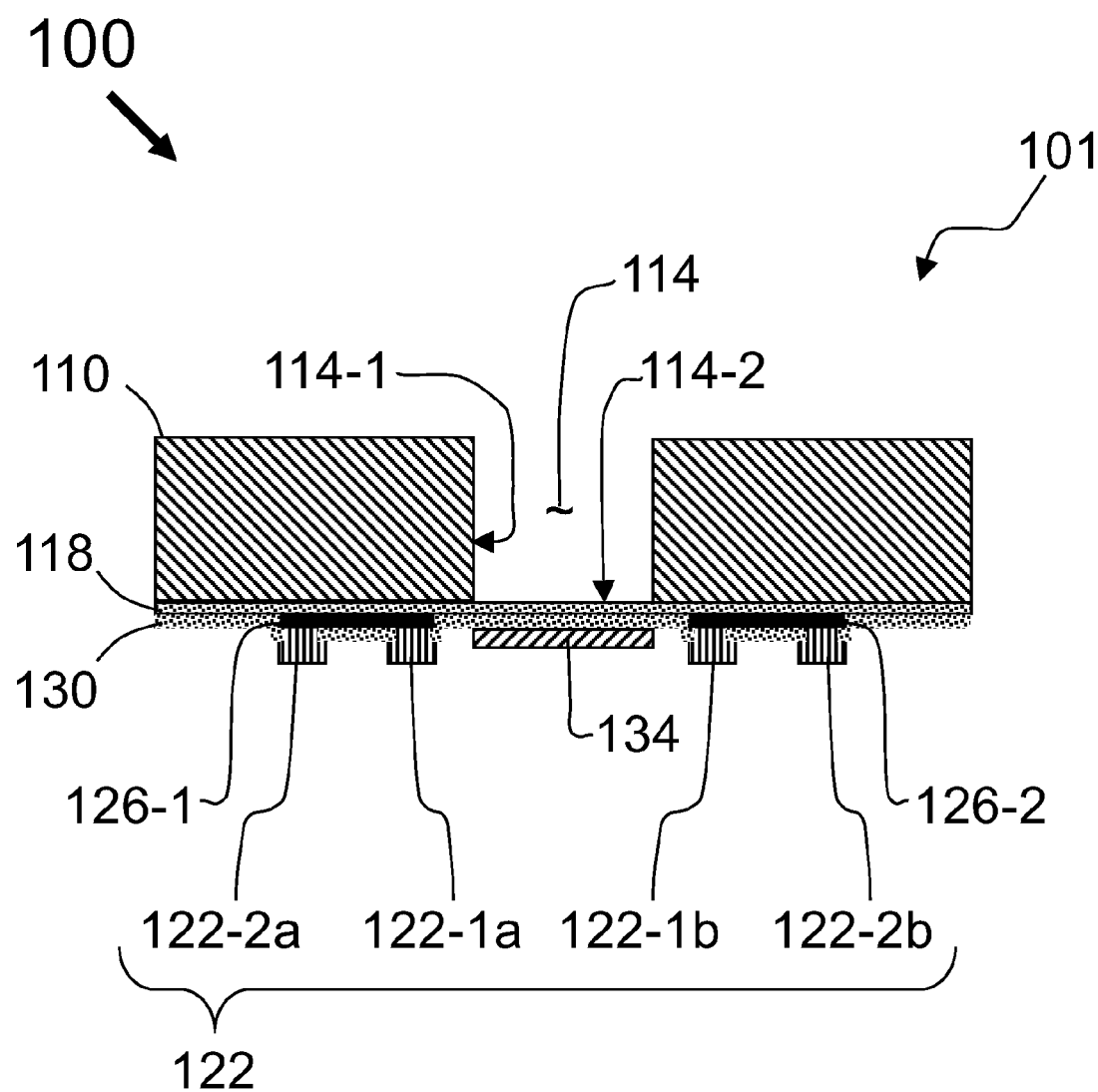
FIG. 1 is a cross-sectional view of a monolithically integrated, self-aligning, optical-fiber ferrule for a pigtailed opto-electronic module, in accordance with examples of the present technology.

The drawings referred to in this description should not be understood as being drawn to scale except if specifically noted.

DESCRIPTION OF EXAMPLES

Reference will now be made in detail to the alternative examples of the present technology. While the technology will be described in conjunction with the alternative examples, it will be understood that they are not intended to limit the technology to these examples. On the contrary, the technology is intended to cover alternatives, modifications and equivalents, which may be included within the spirit and scope of the technology as defined by the appended claims.

Furthermore, in the following description of examples of the present technology, numerous specific details are set forth in order to provide a thorough understanding of the present technology. However, it should be noted that examples of the present technology may be practiced without these specific details. In other instances, well known methods, procedures, and components have not been described in detail as not to unnecessarily obscure examples of the present technology. Throughout the drawings, like components are denoted by like reference numerals, and repetitive descriptions are omitted for clarity of explanation if not necessary. As used herein, the articles, "a" and "an," will be understood as including the plural referents. Also, as used herein, the article, "the," and "said" will be understood as including the plural referents. In addition, as used herein, the term of art, "at least one," will be understood as including the plural referents.

Examples of the present technology include a monolithically integrated, self-aligning, optical-fiber ferrule for a pigtailed opto-electronic module. The ferrule includes a body, a cavity, a lateral alignment structure, and an optical-fiber stop. The cavity includes a body portion defined by cavity side-walls within the body; the cavity is designed to accept an optical fiber with an end of the cavity to face an optical aperture of an opto-electronic component. The lateral alignment structure is coupled to the body, to self-align laterally the optical fiber with the optical aperture of the opto-electronic component. The optical-fiber stop is coupled to the body, and is to self-align vertically the optical fiber relative to the optical aperture of the opto-electronic component. The body, the cavity, the lateral alignment structure and the optical-fiber stop are integrated together as a portion of a monolithically integrated chip. Examples of the present technology also include a pigtailed opto-electronic module that includes the opto-electronic component, the optical fiber, a portion of a circuit carrier, for example a printed-circuit board (PCB), and the monolithically integrated, self-aligning, optical-fiber ferrule.

Moreover, examples of the present technology also include a pigtailed opto-electronic engine that includes a plurality of the pigtailed opto-electronic modules configured as optical output transmitters for bit-lines of an optical bus, or alternatively, optical input receivers on bit-lines of the optical bus. Other examples of the present technology include a system including at least one optical bus and at least one pigtailed opto-electronic engine. Further examples of the present technology include a system including a digital-information processor that includes at least one optical bus and at least one pigtailed opto-electronic engine to transfer information between one component and another component coupled to the optical bus in the digital-information processor. Similarly, yet other examples of the present technology include a system including a data-processing center that includes at least one optical bus and at least one pigtailed opto-electronic engine to transfer information between one digital-information processor and at least one other digital-information processor coupled to the optical bus in the data-processing center. Thus, subsequently described examples of the present technology for the pigtailed opto-electronic module that includes the monolithically integrated, self-aligning, optical-fiber ferrule, as well as the monolithically integrated, self-aligning, optical-fiber ferrule, itself, may also be understood as being incorporated within the following environments: the pigtailed opto-electronic engine, the system including at least one optical bus and at least one pigtailed opto-electronic engine, the digital-information processor, and the data-processing center.

Figure 2:
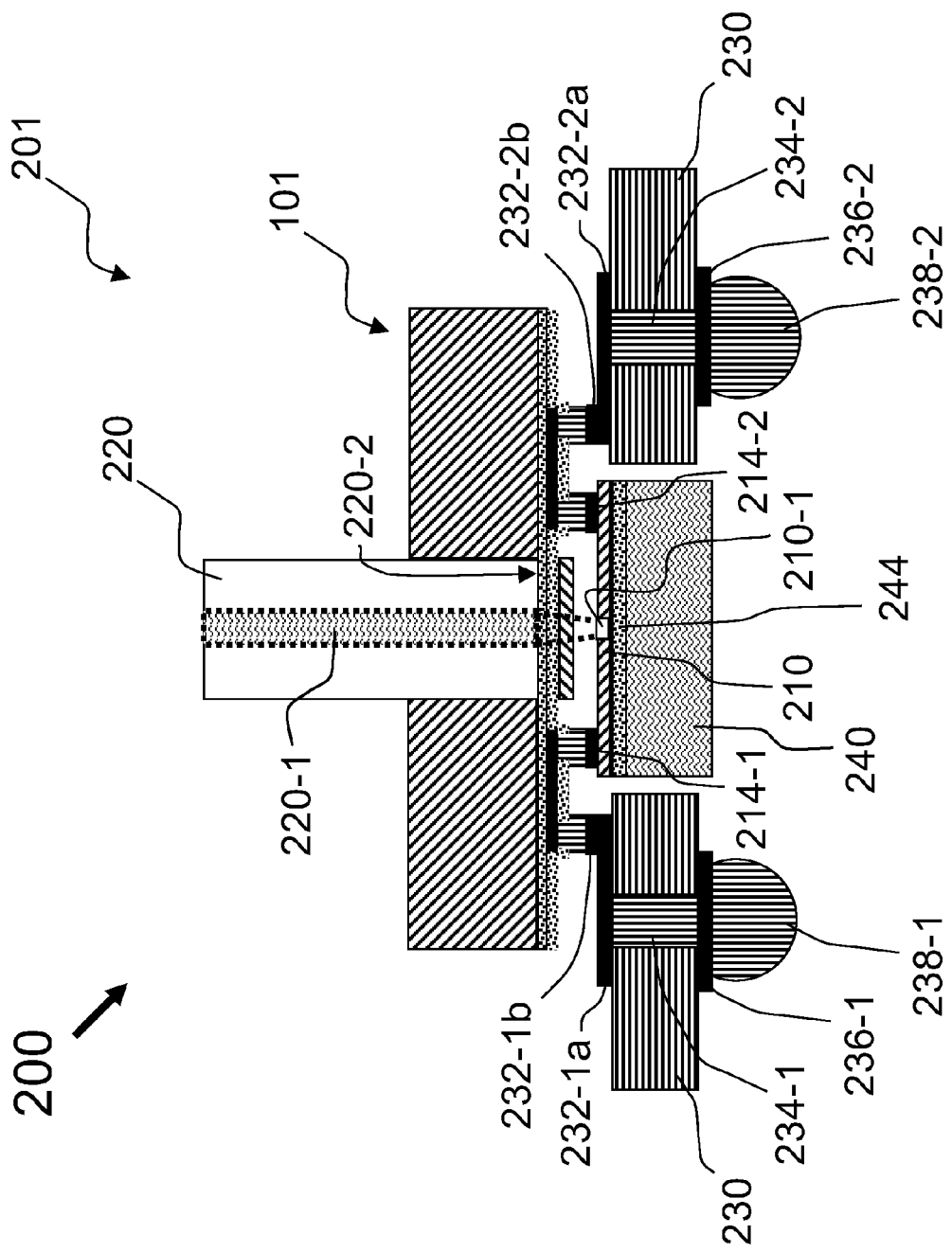
FIG. 2 is a cross-sectional view of the pigtailed opto-electronic module including the monolithically integrated, self-aligning, optical-fiber ferrule of FIG. 1, in accordance with examples of the present technology.

With reference now to FIGS. 1 and 2, in accordance with examples of the present technology, a cross-sectional view 100 is shown in FIG. 1 of a monolithically integrated, self-aligning, optical-fiber ferrule 101 for a pigtailed opto-electronic module 201. The monolithically integrated, self-aligning, optical-fiber ferrule 101 includes a body 110, a cavity 114, a lateral alignment structure 122, and an optical-fiber stop 118. The cavity 114 includes a body portion defined by cavity side-walls 114-1 within the body 110. The cavity 114 is to accept and to align an optical fiber 220; and, an end 114-2 of the cavity 114 is to face an optical aperture 210-1 of an opto-electronic component 210. The cavity 114 may align the optical fiber 220 in as many as 6 axes. For example, the optical fiber 220 may be aligned along the x-axis, y-axis, and z-axis, and for pitch, yaw, and roll with respect to the aperture 210-1 of the opto-electronic component 210. The portion of the optical fiber 220 that is inserted into the cavity 114 can have various shapes, such as, but not limited to, a cylinder, a cylinder with rounded edges, and a cone. Thus, in accordance with examples of the present technology, the cavity 114 may accept an optical fiber 220 with various end shapes, by way of example without limitation thereto, a cleaved end, or alternatively, a lensed end. Thus, the end of the optical fiber 220 may also include a lens (not shown). The lateral alignment structure 122 is coupled to the body 110, and is to self-align laterally the optical fiber 220 with the optical aperture 210-1. The optical-fiber stop 118 is coupled to the body 110. In one example of the present technology, the optical-fiber stop 118 is disposed in proximity to the end 114-2 of the cavity 114.

The optical-fiber stop 118 is to self-align vertically the optical fiber 220 relative to the optical aperture 210-1. The cavity sidewalls 114-1 provide angular and lateral alignment of the optical fiber 220 to the optical aperture 210-1. By way of one example of the present technology, as shown in FIGS. 1 and 2, the optical-fiber stop 118 is disposed outside of the end 114-2 of the cavity 114, without limitation thereto, as in other examples of the present technology, the optical-fiber stop 118 may also be disposed inside of, or alternatively, partially inside and outside of, the end 114-2 of the cavity 114. The body 110, the cavity 114, the lateral alignment structure 122 and the optical-fiber stop 118 are integrated together as a portion of a monolithically integrated chip.

Thus, in accordance with another example of the present technology, as subsequently described in the discussion of FIG. 3A, the ferrule 101 may be fabricated with top-side and back-side processing of a silicon-on-insulator (SOI) wafer. By way of example, in one example of the present technology, the processed SOI wafer may be diced into dies, each die including a single ferrule 101, without limitation thereto. Alternatively, in another example of the present technology, the processed SOI wafer may be diced into dies, each die including a plurality of ferrules, of which ferrule 101 is an example, for coupling with an a plurality of opto-electronic components, of which opto-electronic component 210 is an example, without limitation thereto. In yet another example (not shown) of the present technology, the plurality of ferrules may include a one-dimensional (1D), or alternatively, a two-dimensional (2D), array of cavities, of which cavity 114 is an example, in an arrangement that matches a 1D, or 2D, array of optical fibers, of which optical fiber 220 is an example, or alternatively, that matches other optical transmission media. In this case, an alternative example opto-electronic component may also include a plurality of opto-electronic components, similar to opto-electronic component 210, monolithically integrated into a single die having a corresponding 1D, or 2D, array of optical apertures, of which optical aperture 210-1 is an example, matching the arrangement of the 1D, or 2D, array of cavities, of which cavity 114 is an example. As used herein the term of art, "die," may be understood to include a monolithically integrated chip.

With further reference to FIGS. 1 and 2, in accordance with examples of the present technology, the monolithically integrated, self-aligning, optical-fiber ferrule 101 may also include a plurality of electrical traces 126-1 and 126-2 to convey electrical signals associated with the opto-electronic component 210. The lateral alignment structure 122 may also include a first plurality of solder structures 122-1a and 122-1b; and, the first plurality of solder structures 122-1a and 122-1b may also be disposed at first terminals of the electrical traces 126-1 and 126-2 to couple to the opto-electronic component 210. The ferrule 101 may also include a second plurality of solder structures 122-2a and 122-2b disposed at second terminals of the electrical traces 126-1 and 126-2 to couple to a portion of a circuit carrier, such as, PCB 230, or alternatively, an organic board, flexible printed circuit (FPC), ceramic package, or other type of circuit carrier. The ferrule 101 may also include a passivation layer 130 that is disposed at least over the electrical traces 126-1 and 126-2. The combination of the body 110 and the optical-fiber stop 118 of the ferrule 101 may be part of a SOI substrate, from which the ferrule 101 is fabricated in a monolithic integration process subsequently described in the discussion of FIG. 3A.

Thus, the optical-fiber stop 118 may include an insulator portion of the SOI substrate; and, the body 110 may include a silicon portion of the SOI substrate. Moreover, the SOI substrate may include a portion of a SOI wafer. The SOI substrate may include a substrate selected from the group consisting of, but not limited to, silicon-on-silicon dioxide, silicon-on-sapphire (SOS), and silicon-on-transition metal oxide. Alternatively, in one example of the present technology, the body 110 may include a substrate that is composed of, but not limited to, a material selected from the group consisting of a plastic, a ceramic, a glass, a semiconductor, and a metal. The optical-fiber stop 118 may include an electrically insulating layer including a material selected from, but not limited to, the group consisting of silicon dioxide, silicon sub-oxide, silicon monoxide, sapphire, alumina, sputtered alumina, tantalum oxide, and a transition metal oxide.

In addition, the optical-fiber stop may have a stop structure 118-2 (see FIG. 4) including an aperture 118-1 to allow uninhibited propagation of light between a core 220-1 of the optical fiber 220 and the opto-electronic component 210. The stop structure 118-2 may be a layer composed of a material selected from, but not limited to, the group consisting of a metal, a semiconductor, a dielectric, a plastic, or a ceramic, which is coupled to the body 110. The stop structure 118-2 is coupled to the body 110. In one example of the present technology, the stop structure 118-2 may be disposed in proximity to the periphery of the end 114-2 of the cavity 114. By way of example, the stop structure 118-2 may include an electroplated metal layer, without limitation thereto. The ferrule 101 may further include an optical coating 134 coupled to the body 110 and disposed over the end 114-2 of the cavity 114, to face the optical aperture 210-1 of the opto-electronic component 210. In an alternative example of the present technology, the optical coating 134 may face the cavity 114, directly. In accordance with examples of the present technology, the optical coating 134 may be selected from the group consisting of an anti-reflective coating, a light-absorbing coating, and a light-scattering coating.

With reference now to FIG. 2 and further reference to FIG. 1, in accordance with examples of the present technology, a cross-sectional view 200 is shown in FIG. 2 of the pigtailed opto-electronic module 201 including the monolithically integrated, self-aligning, optical-fiber ferrule 101 of FIG. 1. The pigtailed opto-electronic module 201 includes an opto-electronic component 210, an optical fiber 220, a portion of a circuit carrier, such as, PCB 230, and the monolithically integrated, self-aligning, optical-fiber ferrule 101 of FIG. 1. By way of example, an opto-electronic module having the optical fiber 220 attached may be referred to herein by the term of art, "pigtailed opto-electronic module" 201. However, in accordance with examples of the present technology, the pigtailed opto-electronic module 201 may not have an attached optical fiber 220, in which case the opto-electronic module without the optical fiber 220 attached may be referred to herein simply by the term of art, "opto-electronic module" 305, for example, as subsequently shown in FIG. 3C. As incorporated into the pigtailed opto-electronic module 201, the monolithically integrated, self-aligning, optical-fiber ferrule 101 includes the body 110, the cavity 114, the lateral alignment structure 122, and optical-fiber stop 118. The cavity 114 includes a body portion of the cavity 114 defined by cavity side-walls 114-1 within the body 110. The cavity 114 also contains the optical fiber 220; and, the end 114-2 of the cavity 114 faces the optical aperture 210-1 of the opto-electronic component 210. The lateral alignment structure 122 is coupled to the body 110, such that the optical fiber 220 is self-aligned laterally with the optical aperture 210-1. The optical-fiber stop 118 is coupled to the body 110. In one example of the present technology, the optical-fiber stop 118 is disposed in proximity to the end 114-2 of the cavity 114. The optical-fiber stop 118 is disposed such that the optical fiber 220 is self-aligned vertically with respect to the optical aperture 210-1 of the opto-electronic component 210. By way of one example of the present technology, as shown in FIGS. 1 and 2, the optical-fiber stop 118 is disposed outside of the end 114-2 of the cavity 114, without limitation thereto. However, in alternative examples of the present technology, the optical fiber stop 118 may be disposed completely inside of, or partially inside and outside of, the cavity 114. The body 110, the cavity 114, the lateral alignment structure 122 and the optical-fiber stop 118 are integrated together as a portion of a monolithically integrated chip, previously described in the discussion of FIG. 1. The ferrule 101 is coupled to the opto-electronic component 210, the optical fiber 220 and the portion of the circuit carrier, for example, PCB 230. Thus, in accordance with another example of the present technology, as subsequently described in the discussion of FIGS. 3B-3D, the pigtailed opto-electronic module 201 may be fabricated with die-attachment operation 350, PCB-attachment operation 360, heat-sink-attachment operation 370, and optical-fiber-insertion operation 380. These operations may be performed on individual parts, or at the wafer level of fabrication, or panel level of fabrication.

With further reference to FIGS. 1 and 2, in accordance with examples of the present technology, the ferrule 101 further includes a plurality of electrical traces 126-1 and 126-2 to convey electrical signals associated with the opto-electronic component 210. The lateral alignment structure 122 may also include a first plurality of solder structures 122-1a and 122-1b. The first plurality of solder structures 122-1a and 122-1b is disposed at first terminals of the electrical traces 126-1 and 126-2 and coupled to the opto-electronic component 210. The ferrule 101 may also include a second plurality of solder structures 122-2a and 122-2b disposed at second terminals of the electrical traces 126-1 and 126-2 and coupled to a portion of the circuit carrier, such as, PCB 230, by way of example without limitation thereto, as the circuit carrier may have other components, for example, other pigtailed opto-electronic modules, attached at other portions of the circuit carrier, for example, PCB 230. By way of example, the opto-electronic component 210 may be selected from the group consisting of a vertical-cavity, surface-emitting laser VCSEL, a light emitting diode (LED), an edge emitting laser, an electro-optic modulator, and a photo-diode (PD), without limitation thereto. The pigtailed opto-electronic module 201 may also include a heat sink 240 coupled to the opto-electronic component 210. The heat sink 240 is to dissipate heat generated by the opto-electronic component 210, when the opto-electronic component 210 is electrically powered. The heat sink 240 may be directly attached to a back side of the opto-electronic component 210. Alternatively, a heat sink (not shown) may be indirectly coupled to the opto-electronic component 210, and directly attached to a front side of the ferrule 101.

The first plurality of solder structures 122-1a and 122-1b join the lands 214-1 and 214-2 of the opto-electronic component 210 to the lands of first terminals of the electrical traces 126-1 and 126-2 in solder joints. Lands 214-1 and 214-2 of the opto-electronic component 210, which are joined to respective lands of first terminals of the electrical traces 126-1 and 126-2, may be made wide to facilitate heat transport to the alternative heat sink mounted on the ferrule by lowering thermal resistance for the transport of heat through the solder joints. The ferrule 101 may also include an adhesive that couples a face 220-2 of the optical fiber 220 to the optical-fiber stop 118. The adhesive has an index of refraction matched to an index of refraction of a core 220-1 of the optical fiber 220. The adhesive securely binds the optical fiber 220 to the ferrule 101. Thus, in accordance with examples of the present technology, the optical fiber 220 is aligned with the opto-electronic component 210 to match a numerical aperture of the optical fiber 220 with a numerical aperture of the opto-electronic component 210, and to couple efficiently the optical fiber 220 to the opto-electronic component 210.

With further reference to FIGS. 1 and 2, in accordance with examples of the present technology, the circuit carrier, for example, PCB 230, includes traces 232-1a and 232-2a that provide for continuity of electrical signals to, or from, the opto-electronic component 210 through respective lands 232-1b and 232-2b. In addition, the circuit carrier, such as, PCB 230, includes electrically conducting vias 234-1 and 234-2 that interconnect the traces 232-1a and 232-2a with respective lands 236-1 and 236-2 that are attached to respective solder balls 238-1 and 238-2. The solder balls may constitute a portion of a ball-grid array (BGA) at the back side of the circuit carrier, for example, PCB 230, for interfacing to a land grid array (LGA) of an interposer. The traces 232-1a and 232-2a, electrically conducting vias 234-1 and 234-2, lands 236-1 and 236-2, and solder balls 238-1 and 238-2 provide for continuity of electrical signals to, or from, the opto-electronic component 210 from, or to, the LGA, depending on whether the opto-electronic component 210 is an optical transmitting device, for example a VCSEL, or an optical receiving device, for example, a PD, respectively.

Figure 3A:
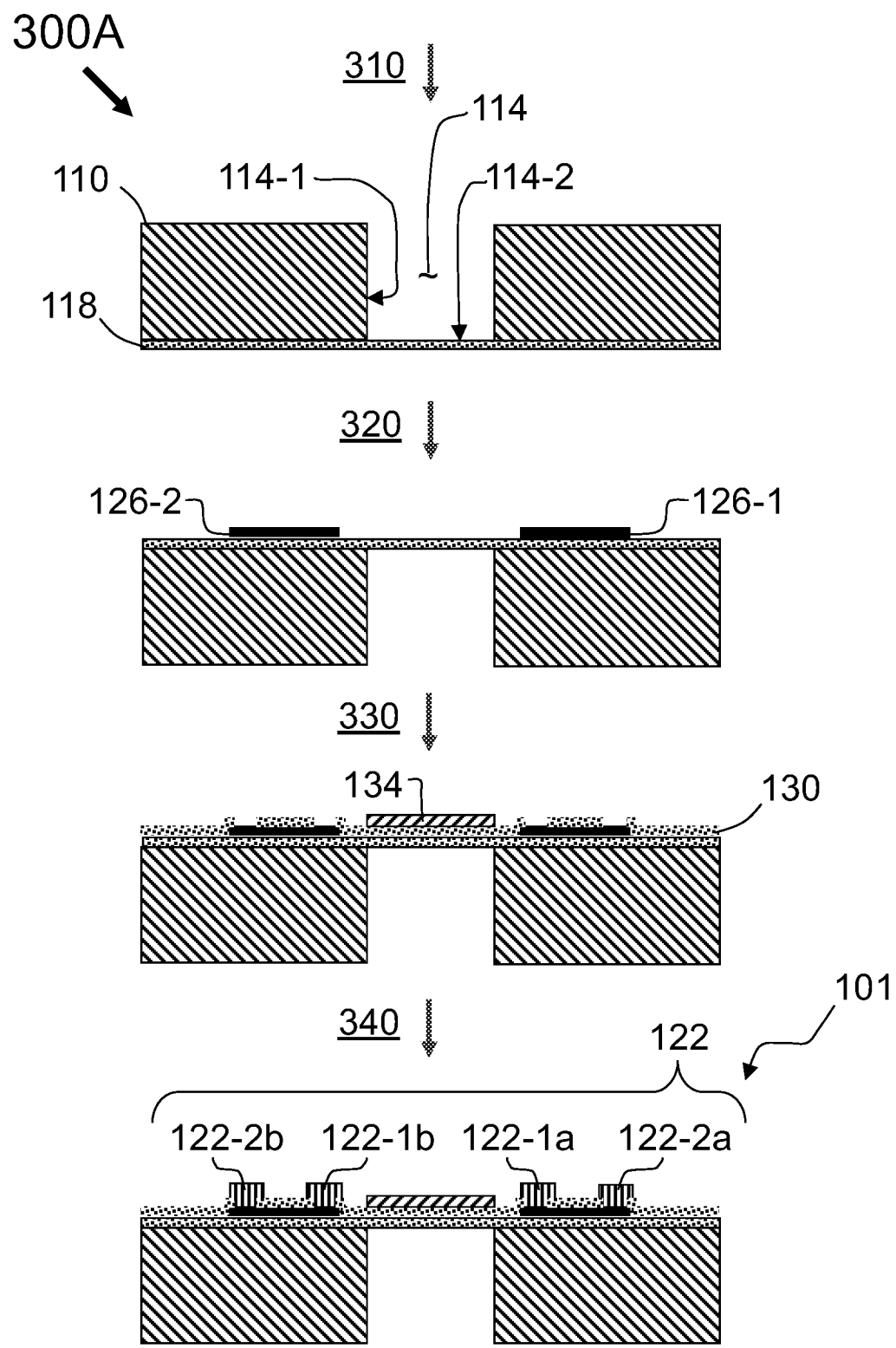
FIG. 3A is a process flow diagram of operations used to fabricate the monolithically integrated, self-aligning, optical-fiber ferrule of FIG. 1, in accordance with examples of the present technology.

With reference now to FIG. 3A and further reference to FIGS. 1 and 2, in accordance with examples of the present technology, a process flow diagram 300A is shown of operations 310-340 used to fabricate the monolithically integrated, self-aligning, optical-fiber ferrule 101 of FIG. 1. The operations for fabricating the monolithically integrated, self-aligning, optical-fiber ferrule 101 include the following. At 310, by way of example, the cavity 114 is made in a substrate using deep reactive-ion etching (DRIE), without limitation thereto, as other processes for forming the cavity are also within the spirit and scope of examples of the present technology. The substrate includes the body 110 and an underlayer that provides the optical-fiber stop 118. The cavity 114 is etched from the top-side of the substrate. As referred to herein, the top-side of the substrate is opposite to the back side of the substrate, which includes the portion having the optical-fiber stop 118 that is to face the opto-electronic component 210. By way of example, the substrate may be a SOI substrate, for example, silicon-on-silicon dioxide; and, the substrate may include an SOI wafer, without limitation thereto. DRIE of the substrate provides the cavity 114 to accept the optical fiber 220; and, the cavity includes side-walls 114-1 and end 114-2 that serve to support and hold the optical fiber 220 in place for alignment with the optical aperture 210-1 of the opto-electronic component 210. As the side-walls 114-1 may be fabricated with processes besides DRIE, the side-walls 114-1 may be other than substantially straight side-walls 414-3 (see FIG. 4) produced by DRIE.

At 320, the substrate is flipped over, and a plurality of electrical traces, by way of example, the plurality of electrical traces 126-1 and 126-2, without limitation thereto, are fabricated on the back side of the substrate. The plurality of electrical traces 126-1 and 126-2 is provided to convey electrical signals associated with the opto-electronic component 210. For example, if the opto-electronic component 210 is an optical transmitting device, such as a VCSEL, the electrical signals may include electrical signals to be converted into transmitted light signals by the VCSEL for transmission on the optical fiber 220. By way of another example, if the opto-electronic component 210 is an optical receiving device, such as a photo-diode (PD), the electrical signals may include electrical signals produced by the PD in response to light signals received from the optical fiber 220.

At 330, a passivation layer 130 is deposited on the back side of the substrate, and an optical-coating layer is deposited on the back side of the substrate. The passivation layer is patterned to provide via-holes to the electrical traces for making electrical contacts with the opto-electronic component 210, and the circuit carrier, for example, PCB 230. Also, the optical-coating layer may be patterned to provide the optical coating 134 over the portion of optical-fiber stop 118 that is to face the opto-electronic component 210. In an alternative example of the present technology, the passivation layer 130 and optical coating 134 may be combined into a single thin-film, or alternatively, into a multilayer (ML) film stack.

At 340, to complete fabrication of the ferrule 101, the lateral alignment structure 122 is fabricated on the back side of the substrate. The lateral alignment structure 122 may include the first plurality of solder structures 122-1a and 122-1b, and the second plurality of solder structures 122-2a and 122-2b. By way of example, the first plurality of solder structures 122-1a and 122-1b and the second plurality of solder structures 122-2a and 122-2b may include a plurality of solder bumps and under-bump metallization to provide for good adhesion and low resistance ohmic-contact to the plurality of electrical traces 126-1 and 126-2. By way of example, the solder bumps may include solder balls. The lateral alignment structure 122 is precisely aligned to the aperture at the end 114-2 of the cavity 114 to ensure optimal coupling between the optical fiber 220 and opto-electronic component 210. Thus, in accordance with examples of the present technology, the preceding operations constitute a process for the production of a ferrule that is a "monolithically integrated" ferrule 101, such that the body, the cavity, the lateral alignment structure and the optical-fiber stop are integrated together as a portion of a monolithically integrated chip. The second plurality of solder structures 122-2a and 122-2b is disposed at the second terminals of the electrical traces 126-1 and 126-2 to couple to a portion of the circuit carrier, for example, PCB 230; and, the first plurality of solder structures 122-1a and 122-1b is disposed at first terminals of the electrical traces 126-1 and 126-2 to couple to the opto-electronic component 210, which is next described in greater detail.

Figure 3B:
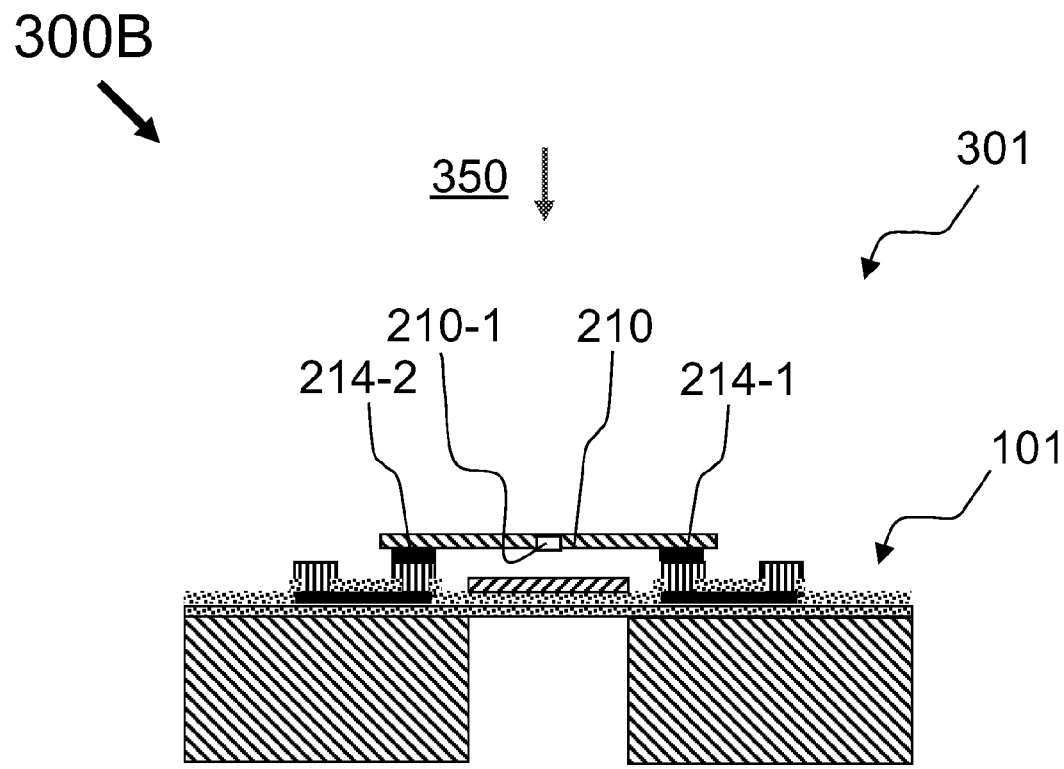
FIG. 3B is a process flow diagram of a die-attachment operation for attaching an opto-electronic component to the ferrule of FIGS. 1 and 3A in the fabrication process of the pigtailed opto-electronic module of FIG. 2, in accordance with examples of the present technology.

With reference now to FIG. 3B and further reference to FIGS. 1-3A, in accordance with examples of the present technology, a process flow diagram 300B is shown of a die-attachment operation 350 for attaching the opto-electronic component 210 to the monolithically integrated, self-aligning, optical-fiber ferrule 101 of FIGS. 1 and 3A in the fabrication process of the pigtailed opto-electronic module 201 of FIG. 2. The following describes the die-attachment operation for fabricating a combined die/ferrule 301 including the opto-electronic component 210. At 350, the die including the opto-electronic component 210 is flip-chip attached to the back side of the ferrule 101. Heat is applied to reflow the first plurality of solder structures 122-1a and 122-1b to form solder joints between the lands 214-1, 214-2 of the opto-electronic component 210 and lands of first terminals of the electrical traces 126-1 and 126-2. The spacing and arrangement of the first plurality of solder structures 122-1a and 122-1b, which may be, for example, solder balls, and the lands 214-1, 214-2 of the opto-electronic component 210 are designed and pre-selected so as to precisely align the optical aperture 210-1 of the opto-electronic component 210 laterally and vertically with the core 220-1 of the optical fiber 220 when the optical fiber 220 is inserted in the course of the fabrication process of the pigtailed opto-electronic module 201. The thickness of solder in the solder structures 122-1*a* and 122-1*b*, or alternatively, the diameter of the solder balls, is chosen to precisely align the optical aperture 210-1 of the opto-electronic component 210 vertically with the core 220-1 of the optical fiber 220. In accordance with examples of the present technology, the size and number of solder structures, similar to solder structures 122-1*a* and 122-1*b*, may be chosen to provide sufficient restoring force to self-align the opto-electronic component 210, as described above. Thus, in accordance with examples of the present technology, the numerical aperture of the optical fiber 220 may be matched to the numerical aperture of the opto-electronic component 210; and, transmission losses at the interface between the optical fiber 220 and the opto-electronic component 210 can be reduced, as compared to opto-electronic modules in which the numerical aperture of the optical fiber 220 may not be well matched to the numerical aperture of the opto-electronic component 210. Surface tension of the reflowed solder assures this alignment in the die-attachment operation 350, which is referred to, herein, as "self-aligning." Thus, in accordance with examples of the present technology, the previously described operations 310-340 constitute a process for the production of a ferrule that is a "self-aligning" ferrule 101, when the die is attached in the die-attachment operation 350.

Figure 3C:
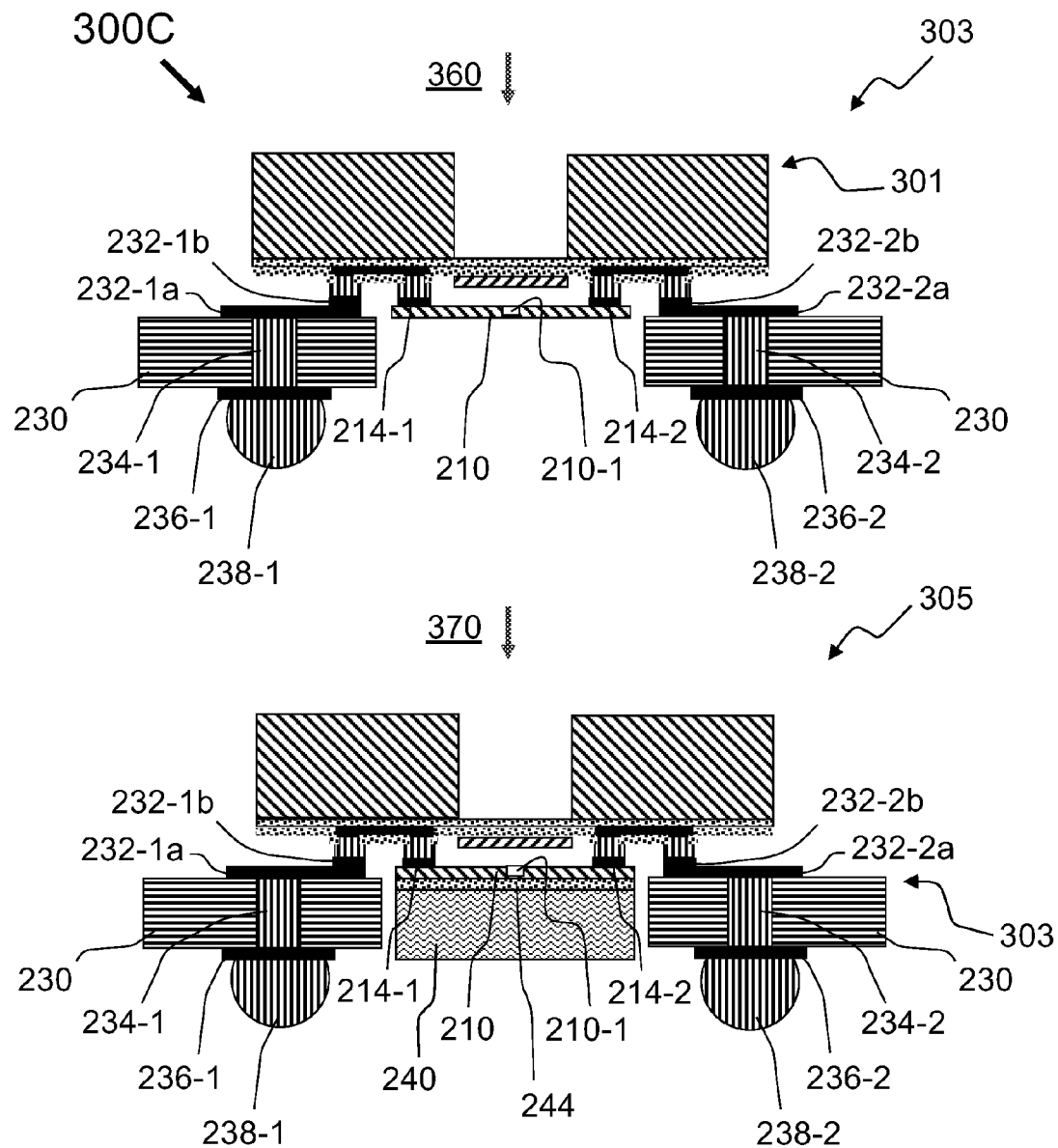
FIG. 3C is a process flow diagram of a printed-circuit-board (PCB) attachment operation and a heat-sink attachment operation for attaching the PCB and the heat sink to the combined die/ferrule shown in FIG. 3B in the fabrication process of the pigtailed opto-electronic module of FIG. 2, in accordance with examples of the present technology.

With reference now to FIG. 3C and further reference to FIGS. 1-3B, in accordance with examples of the present technology, a process flow diagram 300C is shown of the PCB-attachment operation 360 and a heat-sink attachment operation 370 for attaching the circuit carrier, for example, PCB 230, and the heat sink to the combined die/ferrule 301 shown in FIG. 3B in the course of the fabrication process of the pigtailed opto-electronic module 201 of FIG. 2. As the PCB 360 is just one example of a circuit carrier, the PCB-attachment operation 360 is but one example of a circuit-carrier-attachment operation within the spirit and scope of examples of the present technology. At 360, the combined die/ferrule 301 is flip-chip attached to the front side of the circuit carrier, for example, PCB 230. Similar to the die-attachment operation 350 of FIG. 3B, heat is applied to reflow the second plurality of solder structures 122-2*a* and 122-2*b* to form solder joints between the lands 232-1*b*, 232-2*b* of the circuit carrier, for example, PCB 230, and lands of second terminals of the electrical traces 126-1 and 126-2. The spacing and arrangement of the second plurality of solder structures 122-2*a* and 122-2*b*, which may be, for example, solder balls, and the lands 232-1*b* and 232-2*b* of the circuit carrier, for example, PCB 230, are designed and pre-selected to align the combined die/ferrule 301 laterally with the lands 232-1*b* and 232-2*b* of the circuit carrier, for example, PCB 230. The circuit carrier, for example, PCB 230, is provided with traces 232-1*a* and 232-2*a* that provide for continuity of electrical signals to, or from, the opto-electronic component 210. In addition, the circuit carrier, for example, PCB 230, includes electrically conducting vias 234-1 and 234-2 that interconnect the traces 232-1*a* and 232-2*a* with respective lands 236-1 and 236-2 that are attached to respective solder balls 238-1 and 238-2. The solder balls may constitute a portion of a ball-grid array (BGA) at the back side of the circuit carrier, for example, PCB 230, for interfacing to a land grid array (LGA) of an interposer (not shown). The traces 232-1*a* and 232-2*a*, electrically conducting vias 234-1 and 234-2, lands 236-1 and 236-2, and solder balls 238-1 and 238-2 provide for continuity of electrical signals to, or from, the opto-electronic component 210 from, or to, the LGA. Thus, in accordance with examples of the present technology, a combined die/ferrule/circuit carrier 303 is fabricated in the PCB-attachment operation 360.

At 370, the heat sink 240 is attached to the back side of the combined die/ferrule/circuit carrier 303 at the back side of the die of the opto-electronic component 210. The heat sink 240 may be attached with a fastening means, for example, a fastener or a binder. The binder may include an attachment medium 244 that binds the heat sink 240 to the back side of the die of the opto-electronic component 210. The attachment medium has low thermal resistance to facilitate transport of heat from the opto-electronic component 210 to the heat sink 240. Thus, in accordance with examples of the present technology, a combined die/ferrule/circuit carrier/heat sink, referred to herein simply as opto-electronic module 305, is fabricated in the heat-sink attachment operation 370.

Figure 3D:
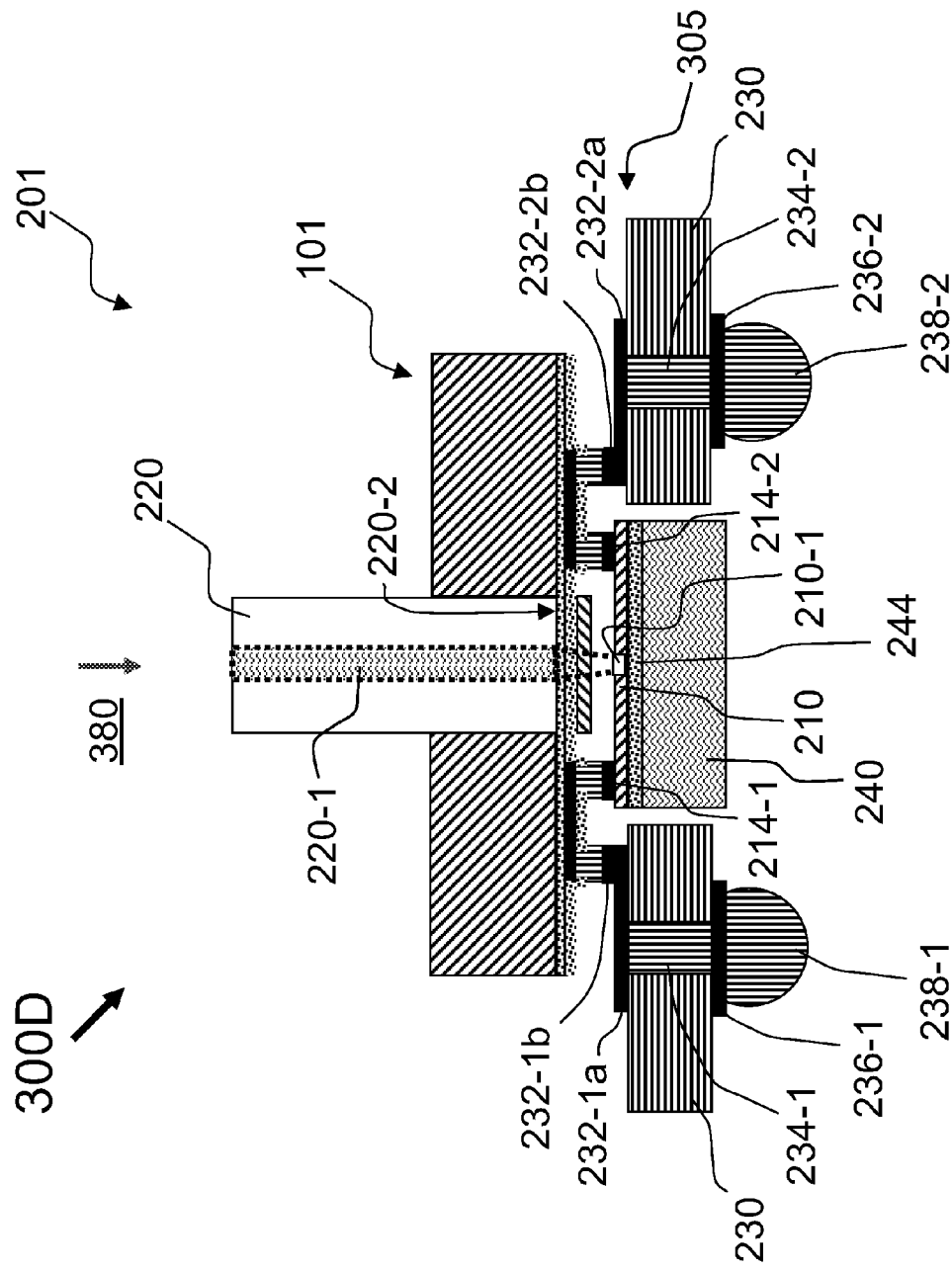
FIG. 3D is a process flow diagram of an optical-fiber-insertion operation for attaching the optical fiber to the opto-electronic module shown in FIG. 3C in the fabrication process of the pigtailed opto-electronic module of FIG. 2, in accordance with examples of the present technology.

With reference now to FIG. 3D and further reference to FIGS. 1-3C, in accordance with examples of the present technology, a process flow diagram 300D is shown of an optical-fiber-insertion operation 380 for attaching the optical fiber 220 to the ferrule 101 of the opto-electronic module 305 shown in FIG. 3C in the fabrication process of the pigtailed opto-electronic module 201 of FIG. 2. At 380, optical fiber 220 is inserted and attached to the monolithically integrated, self-aligning, optical-fiber ferrule 101 of the opto-electronic module 305. The optical fiber 220 is inserted into the cavity 114 of the ferrule 101 up to the end 114-2 of the cavity 114. The side-walls 114-1 of the cavity 114 serve to guide and align the optical fiber 220 to the end 114-2 of the cavity defined by the optical-fiber stop 118 and optical aperture 210-1 of the optoelectronic component, respectively. The face 220-2 of the optical fiber 220 may be attached to the surface of optical-fiber stop 118 facing the optical fiber 220 with an adhesive (not shown). The index of refraction of the adhesive matches the index of refraction of the core 220-1 of the optical fiber 220. Thus, in accordance with examples of the present technology, a pigtailed opto-electronic module 201 is fabricated in the optical-fiber-insertion operation 380. As the opto-electronic module is provided with an optical fiber 220, it is referred to as a "pigtailed" opto-electronic module 201, and may thus constitute a portion of a "pigtailed" opto-electronic engine 501 (see FIG. 5A), which is subsequently described.

The optical-fiber-insertion operation 380 ensures that the optical fiber 220 is vertically, laterally, and angularly self-aligned with the opto-electronic component 210, which eliminates time-consuming alignment procedures that rely on monitoring the optical-signal output from the fiber while moving the optical fiber 220 to a position that peaks the optical signal on the optical fiber from a light-transmitting opto-electronic component 210, or alternatively, monitoring the electrical-signal output from a light-receiving opto-electronic component 210 while moving the optical fiber 220 to a position that peaks the electrical signal from the light-receiving opto-electronic component 210. Moreover, as a result of the matching of numerical apertures and spot sizes between the optical fiber 220 and the opto-electronic component 210, in accordance with examples of the present technology, a lens can be omitted from the optical pathway, as a superfluous element, for focusing light emerging from a light-transmitting opto-electronic component 210, for example, a VCSEL, to fill the entrance pupil of the core 220-1 of the optical fiber 220, or alternatively, for focusing light emerging from the core 220-1 of an optical fiber 220 onto the entrance pupil of a light-receiving opto-electronic component 210, for example, a PD. Thus, the pigtailed opto-electronic module 201 can be fabricated without a lens, as a "lensless" pigtailed opto-electronic module 201; and, the cost of fabricating the pigtailed opto-electronic module 201 is substantially reduced.

Figure 4:
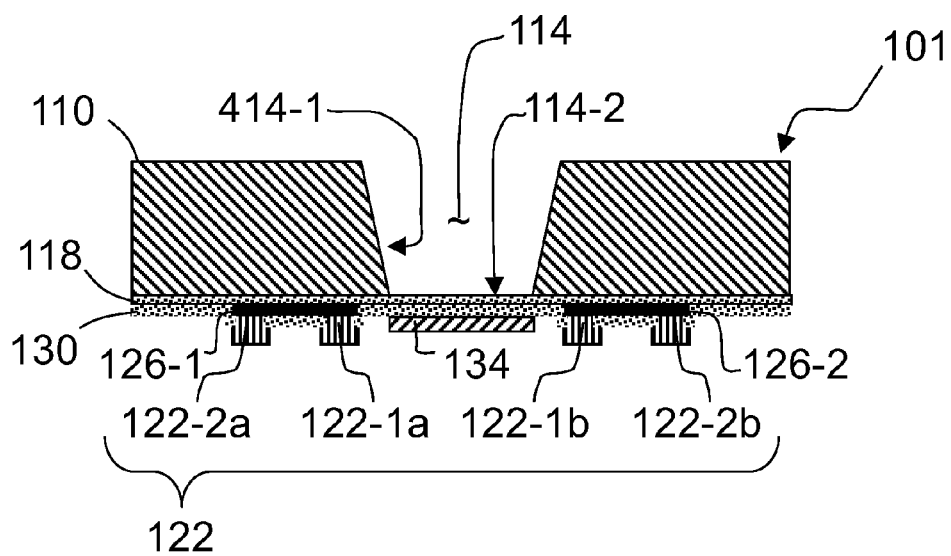
FIG. 4 is a cross-sectional view comparing two examples of the ferrule: one example including a cavity with tapered side-walls and an optical-fiber stop disposed in proximity to the end of the cavity, and another example including a cavity with substantially straight side-walls and an optical-fiber stop having an alternative stop structure, in accordance with examples of the present technology.
Figure 4:
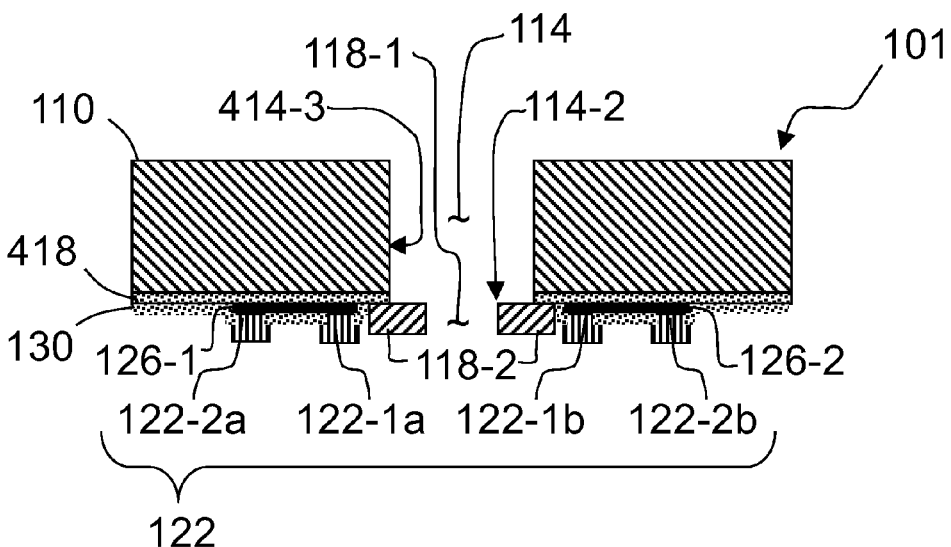

With reference now to FIG. 4 and further reference to FIGS. 1-3A, in accordance with examples of the present technology, a cross-sectional view 400 is shown that compares two examples of the monolithically integrated, self-aligning, optical-fiber ferrule 101. The monolithically integrated, self-aligning, optical-fiber ferrule 101 of example 1 shown at the top of FIG. 4 includes a cavity with tapered side-walls 414-1 and an optical-fiber stop 118 coupled to the body 110. As shown in FIG. 4, in one example of the present technology, the optical-fiber stop 118 may be disposed in proximity to the end 114-2 of the cavity 114. The optical-fiber stop 118 may include the insulator of a SOI substrate. The tapered side-walls 414-1 of the cavity 114 may be fabricated by adjusting the chemical composition of reactive ions used in a reactive-ion etching (RIE) process, instead of the DRIE process of operation 310, discussed above. In an alternative example of the present technology, the shape of the side-walls may be, but not limited to, a curved or a vertical shape with chamfered corners. Thus, in accordance with examples of the present technology, the shape of the cavity 114 may be chosen to provide initial coarse alignment of the optical fiber 220 followed by fine alignment of the optical fiber 220, because of the narrowing of the cavity 114 in proximity to the end 114-2 of the cavity 114. The chemical composition can be adjusted to slow the rate of vertical etching, while maintaining a constant rate of lateral etching.

Alternatively, the monolithically integrated, self-aligning, optical-fiber ferrule 101 of example 2 shown at the bottom of FIG. 4 includes a cavity 114 with substantially straight side-walls 414-3 and an optical-fiber stop having an alternative stop structure 118-2. As used herein substantially straight side-walls means side-walls that are as straight as might be made with the DRIE process. The substantially straight side-walls 414-3 can be produced with the DRIE process of operation 310, discussed above. However, the chemical composition of the reactive ions used in the DRIE process can be altered so that etching of the insulator 418 continues instead of stopping upon encountering the insulator of the SOI substrate. Prior to etching the cavity 114, a stop structure 118-2 may be fabricated over the location where the cavity 114 is to be etched. The stop structure 118-2 may include a metallic layer that is patterned to have an aperture 118-1 that is to allow the passage of light to, or from, the opto-electronic component 210. The diameter of the aperture 118-1 in the stop structure 118-2 may be about the same as the diameter of the core 220-1 of the optical fiber 220, without limitation thereto.

Figure 5A:
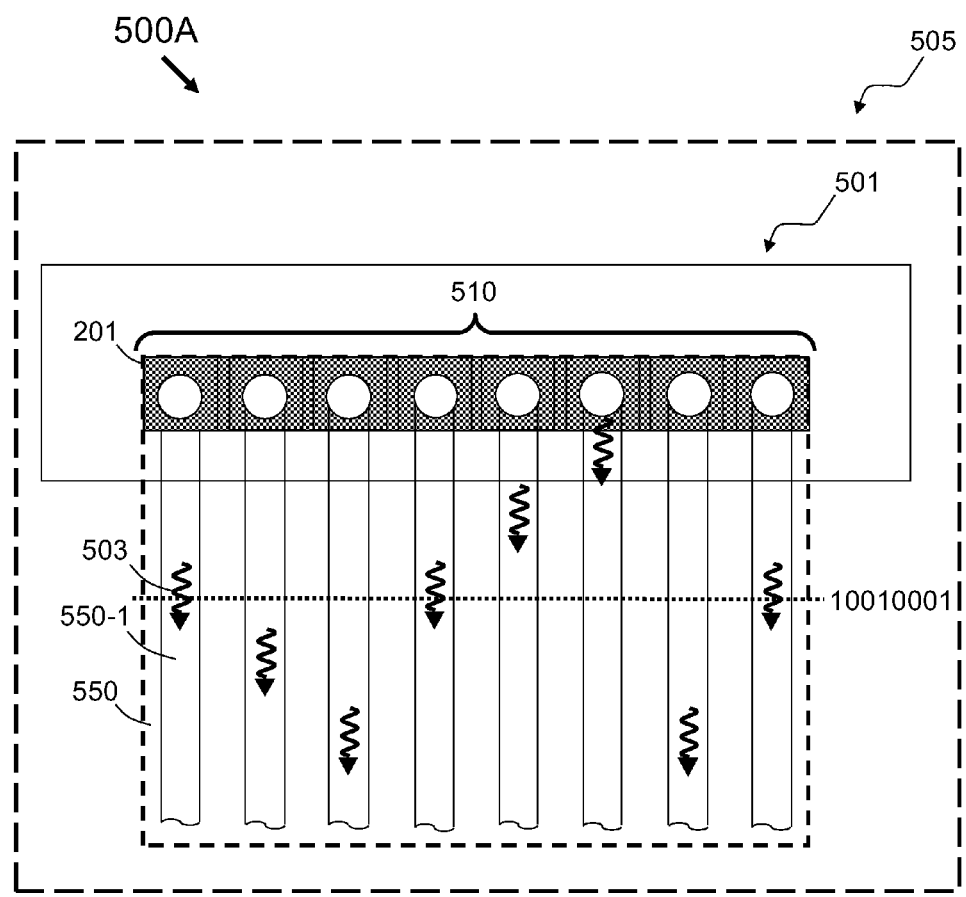
FIG. 5A is a schematic diagram of a pigtailed opto-electronic engine including a plurality of pigtailed opto-electronic modules of which the pigtailed opto-electronic module of FIG. 2 is an example, and an example system including at least one optical bus and at least one pigtailed opto-electronic engine, in accordance with examples of the present technology.

With reference now to FIG. 5A and further reference to FIGS. 1-4, in accordance with examples of the present technology, a schematic diagram 500A is shown of a pigtailed opto-electronic engine 501 including a plurality 510 of pigtailed opto-electronic modules, of which pigtailed opto-electronic module 201 is an example. The plurality 510 of the pigtailed opto-electronic modules may be arranged in an array coupled to a circuit carrier, for example, PCB 230. By way of example, as shown in FIG. 5A, in accordance with one example of the present technology, the array of pigtailed opto-electronic modules may be one by eight, without limitation thereto. Alternatively, by way of another example (not shown) of the present technology, the array of pigtailed opto-electronic modules may be one by twelve, without limitation thereto. Alternatively, in accordance with examples of the present technology, the array of pigtailed opto-electronic modules may be more generally n by m, where n is the number of rows in the array, and m is the number of columns in the array. Similarly, a plurality of monolithically integrated, self-aligning, optical-fiber ferrules, of which monolithically integrated, self-aligning, optical-fiber ferrule 101 is an example, may be arranged in an array of monolithically integrated, self-aligning, optical-fiber ferrules coupled to a plurality of individual opto-electronic components, of which opto-electronic component 210 is an example, or alternatively, to monolithically integrated opto-electronic components on a single die.

Similarly, by way of example, as shown in FIG. 5A, in accordance with one example of the present technology, the array of monolithically integrated, self-aligning, optical-fiber ferrules may be one by eight, without limitation thereto. Alternatively, by way of another example (not shown) of the present technology, the array of monolithically integrated, self-aligning, optical-fiber ferrules may be one by twelve, without limitation thereto. Alternatively, in accordance with examples of the present technology, the array of monolithically integrated, self-aligning, optical-fiber ferrules may be more generally n by m, where n is the number of rows in the array, and m is the number of columns in the array. In accordance with one example of the present technology, such arrays of monolithically integrated, self-aligning, optical-fiber ferrules may be fabricated as a single monolithically integrated SOI chip. The circuit carrier, for example, PCB 230, may also include a plurality of solder balls arranged in a BGA to convey electrical signals associated with the opto-electronic components, of which opto-electronic component 210 is an example, to or from a system board on which a LGA is disposed.

Previously described examples of the present technology for the pigtailed opto-electronic module 201 of FIGS. 2 and 3D may be incorporated within the environment of a pigtailed opto-electronic engine 501. Therefore, previously described examples of the present technology for the monolithically integrated, self-aligning, optical-fiber ferrule 101 of FIGS. 1-4, as being incorporated in the pigtailed opto-electronic module 201, may be similarly incorporated within the environment of the pigtailed opto-electronic engine 501. By way of example, as shown in FIG. 5A, the pigtailed opto-electronic engine 501 may be configured as an optical bus transmitter, as for the case in which the plurality of opto-electronic components is a plurality of VCSELs without limitation thereto. In accordance with examples of the present technology, as shown in FIG. 5A, a pigtailed opto-electronic module 201 of the plurality 510 of pigtailed opto-electronic modules may be configured as an optical output transmitter for an optical fiber that serves as a bit-line, for example, bit-line 550-1, of an optical bus 550. Each bit-line in optical bus 550 is to receive light emitted from a pigtailed opto-electronic module of the pigtailed opto-electronic engine 501; for example, bit-line 550-1 is to receive light 503 emitted from pigtailed opto-electronic module 201 of the plurality 510 of pigtailed opto-electronic modules in the pigtailed opto-electronic engine 501. A portion of the bit-line 550-1 may include the pigtail portion, the optical fiber 220, attached to the pigtailed opto-electronic module 201. As shown in FIG. 5A, the bit-lines in optical bus 550 may be to transmit a byte of information associated in positive logic with a bit corresponding to a pulse of light emitted from selected pigtailed opto-electronic modules of the plurality 510. Alternatively, by way of another example (not shown), the pigtailed opto-electronic engine 501 may be configured as an optical bus receiver, as for the case in which the plurality of opto-electronic components is a plurality of PDs, without limitation thereto.

However, for the optical transmitter example of FIG. 5A, with further reference to FIGS. 1-4, a pulse of light 503 emitted from pigtailed opto-electronic module 201 corresponds to a first bit, a logical "1," of an eight-bit byte, given by bit-string "10010001," which corresponds to pulses of light emitted from selected pigtailed opto-electronic modules of the plurality 510 (as is indicated by the dotted line in FIG. 5A). By way of example, FIG. 5A shows the optical bus 550 configured for the transmission of eight-bit bytes, without limitation thereto. However, optical buses including more or less optical fibers than shown in FIG. 5A are also within the spirit and scope of examples of the present technology, for example, in the case of an optical bus including twelve optical fibers. Moreover, by way of example, the optical bus 550 in FIG. 5A has been so far described as transmitting bytes in a parallel-bus configuration; but, the optical bus 550 may also transmit bytes serially on each individual bit-line, in accordance with examples of the present technology.

In FIG. 5A, in accordance with examples of the present technology, the schematic diagram 500A also shows an example system 505 including at least one optical bus 550 and at least one pigtailed opto-electronic engine 501. In another example of the technology, the opto-electronic module 510 can be a transceiver composed of a plurality of VCSELs and PDs. However, examples of the present technology also include within their spirit and scope systems with other components integrated with the optical buses and pigtailed opto-electronic engines, similar to optical bus 550 and pigtailed opto-electronic engine 501, which are next described.

Figure 5B:
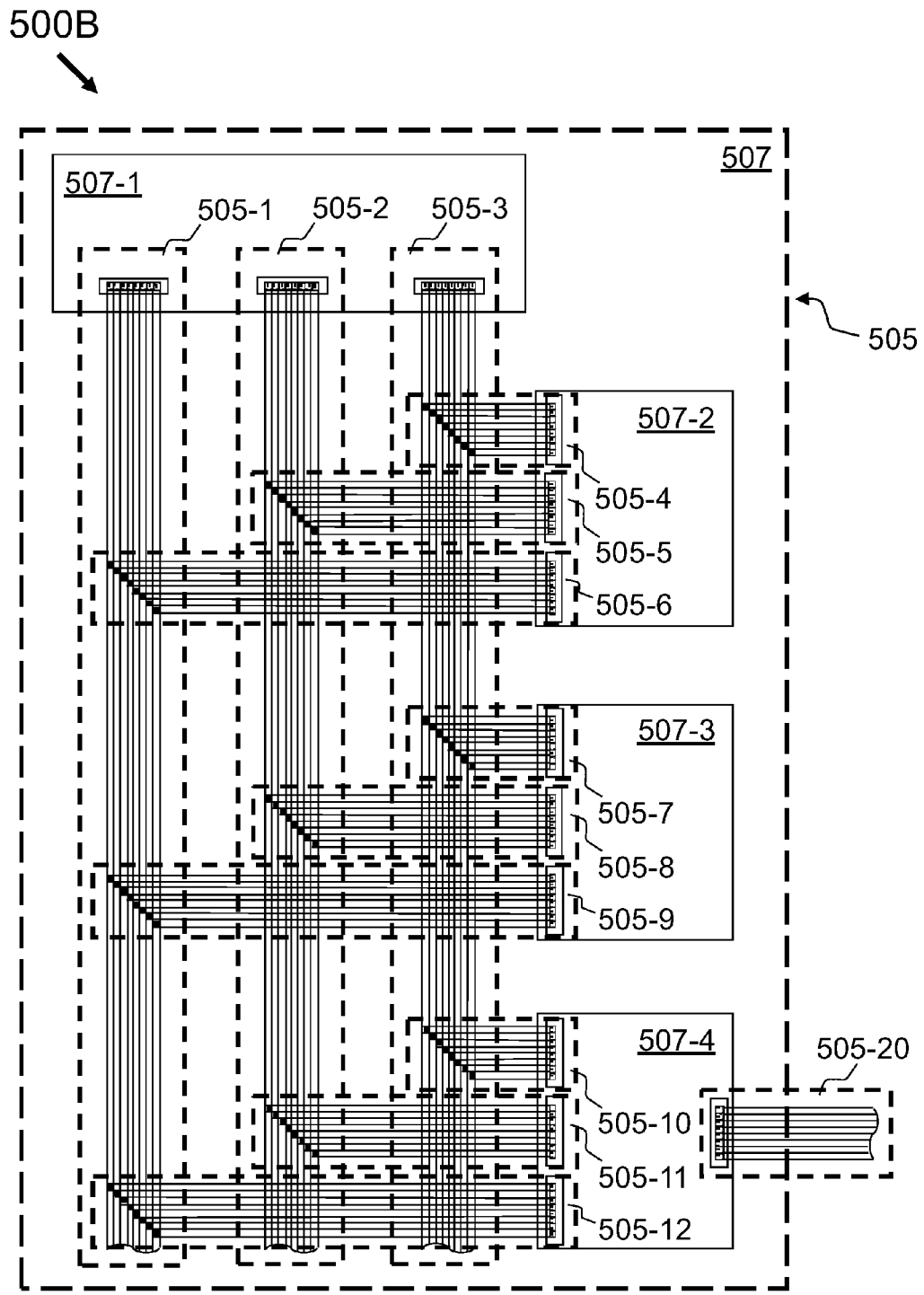
FIG. 5B is a schematic diagram of another example system, a digital-information processor, including at least one optical bus and at least one pigtailed opto-electronic engine of FIG. 5A, in accordance with examples of the present technology.

With reference now to FIG. 5B and further reference to FIG. 5A, in accordance with examples of the present technology, a schematic diagram 500B is shown of yet another example system 505, which includes a digital-information processor 507, including at least one optical bus and at least one pigtailed opto-electronic engine, for example, optical bus 550 and pigtailed opto-electronic engine 501. In accordance with examples of the present technology, the system 505 may further include an integrated combination of components, for example, a digital-information processor 507. In accordance with examples of the present technology, the digital-information processor 507 includes a plurality of components 507-1, 507-2, 507-3 and 507-4 integrated with at least one optical bus and at least one pigtailed opto-electronic engine, for example, pigtailed opto-electronic engine 501. In accordance with examples of the present technology, at least one optical bus and at least one pigtailed opto-electronic engine are to transfer information between one component and another component coupled to the optical bus in the digital-information processor 507. As used herein, a digital-information processor 507 includes an electronic apparatus that processes at least some information in digital form, for example, a computer, a server, a switch, a router, or a digital-electronic apparatus, without limitation thereto, such that the digital information is conveyed by at least one optical bus and at least one pigtailed opto-electronic engine. For example, digital-information processor 507 may include a server including components 507-1, 507-2, 507-3 and 507-4 such that components 507-1, 507-2, 507-3 and 507-4 are: a central processing unit (CPU), a program memory, a data memory, and an input/output module, respectively.

With further reference to FIGS. 5A and 5B, in accordance with examples of the present technology, digital-information processor 507 is integrated with plurality of components 507-1, 507-2, 507-3 and 507-4 with a plurality of combined optical bus/pigtailed opto-electronic engines 505-1, 505-2, 505-3, 505-4, 505-5, 505-6, 505-7, 505-8, 505-9, 505-10, 505-11 and 505-12, similar to the optical bus 550 and pigtailed opto-electronic engine 501 of FIG. 5A. As shown in FIG. 5B, the respective combined optical bus/pigtailed opto-electronic engines 505-1, 505-2 and 505-3 are coupled with components 507-2, 507-3 and 507-4 by respective combined optical bus/pigtailed opto-electronic engines, viz.: combined optical bus/pigtailed opto-electronic engine 505-1 is coupled with components 507-2, 507-3 and 507-4 by respective combined optical bus/pigtailed opto-electronic engines 505-6, 505-9 and 505-12; combined optical bus/pigtailed opto-electronic engine 505-2 is coupled with components 507-2, 507-3 and 507-4 by respective combined optical bus/pigtailed opto-electronic engines 505-5, 505-8 and 505-11; and, combined optical bus/pigtailed opto-electronic engine 505-3 is coupled with components 507-2, 507-3 and 507-4 by respective combined optical bus/pigtailed opto-electronic engines 505-4, 505-7 and 505-10. As shown in FIG. 5B, by way of example, the combined optical bus/pigtailed opto-electronic engines may be configured as bi-directional devices such that a pigtailed opto-electronic engine is disposed at either end of an optical bus, without limitation thereto.

Moreover, with further reference to FIGS. 5A and 5B, optical-bus receivers (not shown) may be interfaced to one or another end of an optical bus such that bi-directional and uni-directional optical buses are within the spirit and scope of examples of the present technology. By way of further example, in one example of the present technology, for the system 505 including a server as digital-information processor 507, the CPU, component 507-1, may be integrated with the program memory, the data memory, and the input/output module, respectively, components 507-2, 507-3 and 507-4, with a data bus, a control bus and an address bus. For one example of the present technology in which the system 505 includes the server, the data bus is included in respective combined optical bus/pigtailed opto-electronic engines 505-1, 505-6, 505-9 and 505-12; the control bus is included in respective combined optical bus/pigtailed opto-electronic engines 505-2, 505-5, 505-8 and 505-11; and, the address bus is included in respective combined optical bus/pigtailed opto-electronic engines 505-3, 505-4, 505-7 and 505-10. As shown in FIG. 5B, in another example of the present technology, the digital-information processor 507 may include an input/output module, component 507-4, that is coupled with a combined optical bus/pigtailed opto-electronic engine 505-20 that provides for the input, and/or output, of digital information to, and/or from, the digital-information processor 507, for example, a server, a router, or a switch, which is next described.

Figure 5C:
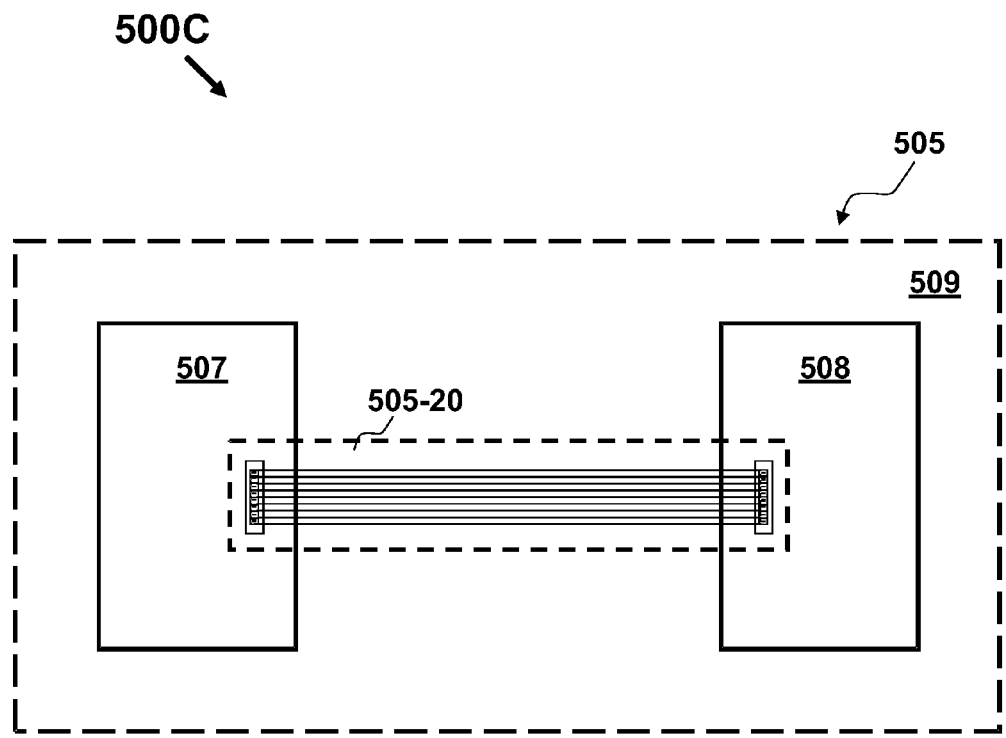
FIG. 5C is a schematic diagram of yet another example system, a data-processing center, including at least one optical bus and at least one pigtailed opto-electronic engine of FIG. 5A, in accordance with examples of the present technology.

With reference now to FIG. 5C and further reference to FIGS. 5A and 5B, in accordance with examples of the present technology, a schematic diagram 500C is shown of yet another example system 505, a data-processing center 509 including at least one optical bus and at least one pigtailed opto-electronic engine, for example, optical bus 550 and pigtailed opto-electronic engine 501 of FIG. 5A. In accordance with examples of the present technology, the system 505 may further include an integrated combination of components, for example, a data-processing center 509. In accordance with examples of the present technology, the data-processing center 509 includes a plurality of digital-information processors, for example, digital-information processors 507 and 508, integrated with at least one optical bus and at least one pigtailed opto-electronic engine, for example, combined optical bus/pigtailed opto-electronic engine 505-20. In accordance with examples of the present technology, at least one optical bus and at least one pigtailed opto-electronic engine are to transfer information between one digital-information processor 507 and another digital-information processor 508 coupled to the optical bus in the data-processing center 509. By way of example, in one example of the present technology, data-processing center 509 may include one server, router, or switch, including digital-information processor 507, and another server, router, or switch, including digital-information processor 508, without limitation thereto. However, examples of the present technology also include within their spirit and scope systems that include a plurality of servers, routers, switches, or combinations of servers, routers, or switches, integrated with combined optical bus/pigtailed opto-electronic engines, of which combined optical bus/pigtailed opto-electronic engine 505-20 is an example.

The foregoing descriptions of specific examples of the present technology have been presented for purposes of illustration and description. They are not intended to be exhaustive or to limit the technology to the precise forms disclosed, and many modifications and variations are possible in light of the above teaching. The examples described herein were chosen and described in order to best explain the principles of the technology and its practical application, to thereby enable others skilled in the art to best utilize the technology and various examples with various modifications as are suited to the particular use contemplated. It may be intended that the scope of the technology be defined by the claims appended hereto and their equivalents.

What is claimed is:

1. A monolithically integrated, self-aligning, optical-fiber ferrule for a pigtailed opto-electronic module, said ferrule comprising:
   a body;
   a cavity including a body portion defined by cavity side-walls within said body, said cavity to accept and align an optical fiber, an end of said cavity to face an optical aperture of an opto-electronic component;
   a lateral alignment structure coupled to said body comprising multiple pluralities of solder structures, to self-align laterally said optical fiber with said optical aperture and to couple to said opto-electronic component and a portion of a circuit carrier; and
   an optical-fiber stop coupled to said body, to self-align vertically said optical fiber relative to said optical aperture; and
   wherein said body, said cavity, said lateral alignment structure and said optical-fiber stop are integrated together as a portion of a monolithically integrated chip.

2. The monolithically integrated, self-aligning, optical-fiber ferrule of claim 1, further comprising:
   a plurality of electrical traces to convey electrical signals associated with said opto-electronic component.

3. The monolithically integrated, self-aligning, optical-fiber ferrule of claim 2, wherein said lateral alignment structure further comprises a first plurality of solder structures, said first plurality of solder structures disposed at first terminals of said electrical traces to couple to said opto-electronic component.

4. The monolithically integrated, self-aligning, optical-fiber ferrule of claim 3, further comprising:
   a second plurality of solder structures disposed at second terminals of said electrical traces to couple to a portion of a circuit carrier.

5. The monolithically integrated, self-aligning, optical-fiber ferrule of claim 1, wherein said body and said optical-fiber stop comprise a silicon-on-insulator substrate.

6. The monolithically integrated, self-aligning, optical-fiber ferrule of claim 5, wherein said optical-fiber stop forms an insulator portion of said silicon-on-insulator substrate.

7. The monolithically integrated, self-aligning, optical-fiber ferrule of claim 1, wherein said optical-fiber stop comprises a layer composed of a material selected from the group consisting of an electrically insulator, a plastic, a ceramic, a glass, a semiconductor, and a metal; and wherein said body includes a substrate composed of a material selected from the group consisting of a plastic, a ceramic, a glass, a semiconductor, and a metal.

8. The monolithically integrated, self-aligning, optical-fiber ferrule of claim 1, wherein said optical-fiber stop comprises a stop structure including an aperture to allow uninhibited propagation of light between a core of said optical fiber and said opto-electronic component.

9. The monolithically integrated, self-aligning, optical-fiber ferrule of claim 1, further comprising:
   an optical coating coupled to said body and disposed over said end of said cavity; and
   wherein said optical coating is selected from the group consisting of an anti-reflective coating, a light-absorbing coating, and a light-scattering coating.

10. The monolithically integrated, self-aligning, optical-fiber ferrule of claim 1, wherein said optical-fiber stop is disposed outside of said end of said cavity and partially inside of said end of said cavity.

11. The monolithically integrated, self-aligning, optical-fiber ferrule of claim 1, wherein said optical-fiber stop includes at least one of silicon dioxide, silicon sub-oxide, silicon monoxide, sapphire, alumina, sputtered alumina, and tantalum oxide.

12. The monolithically integrated, self-aligning, optical-fiber ferrule of claim 1, further comprising an adhesive to couple a face of said optical fiber to said optical-fiber stop.

13. The monolithically integrated, self-aligning, optical-fiber ferrule of claim 12, wherein an index of refraction of the adhesive matches an index of refraction of a core of said optical fiber.

14. The monolithically integrated, self-aligning, optical-fiber ferrule of claim 1, wherein said side walls are straight.

15. A pigtailed opto-electronic engine, comprising:
   a pigtailed opto-electronic module, comprising:
      an opto-electronic component;
      an optical fiber;
      a portion of a circuit carrier; and
      a monolithically integrated, self-aligning, optical-fiber ferrule, comprising:
         a body, a cavity including a body portion defined by cavity side-walls within said body, said cavity containing and aligning said optical fiber, an end of said cavity facing an optical aperture of said opto-electronic component;
         a lateral alignment structure coupled to said body, to:
            self aligning self-align said optical fiber laterally with said optical aperture; and
            couple said ferrule to said opto-electronic component and said portion of said circuit carrier; and
         an optical-fiber stop coupled to said body and disposed in proximity to said end of said cavity, self-aligning said optical fiber vertically relative to said optical aperture;
         wherein said body, said cavity, said lateral alignment structure and said optical-fiber stop are integrated together as a portion of a monolithically integrated chip; and
      wherein said ferrule is coupled to said opto-electronic component, said optical fiber and said portion of said circuit carrier.

16. The pigtailed opto-electronic engine of claim 15, wherein said opto-electronic component is selected from the group consisting of a vertical-cavity, surface-emitting laser (VCSEL), a light emitting diode (LED), an edge emitting laser, an external modulator, and a photo-diode.

17. The pigtailed opto-electronic engine, of claim 15, further comprising:
a plurality of said pigtailed opto-electronic modules configured as an array coupled to said circuit carrier.

18. The pigtailed opto-electronic engine of claim 15, wherein said optical-fiber stop comprises a layer composed of a material selected from the group consisting of, a plastic, a ceramic, a glass, a semiconductor, and a metal; and wherein said body includes a substrate composed of a material selected from the group consisting of a plastic, a ceramic, a glass, a semiconductor, and a metal.

19. A system, comprising:
an optical bus; and
a pigtailed opto-electronic engine coupled with said optical bus, said pigtailed opto-electronic engine comprising:
  a plurality of pigtailed opto-electronic modules, a pigtailed opto-electronic module of said plurality comprising:
    an opto-electronic component;
    an optical fiber;
    a portion of a circuit carrier; and
    a monolithically integrated, self-aligning, optical-fiber ferrule, comprising:
      a body,
      a cavity including a body portion defined by cavity side-walls within said body, said cavity containing and aligning said optical fiber, an end of said cavity facing an optical aperture of said opto-electronic component;
      a lateral alignment structure coupled to said body, self-aligning said optical fiber laterally with said optical aperture; and
      an optical-fiber stop coupled to said body and disposed in proximity to said end of said cavity, self-aligning said optical fiber vertically relative to said optical aperture;
    wherein said body, said cavity, said lateral alignment structure and said optical-fiber stop are integrated together as a portion of a monolithically integrated chip; and
    wherein said ferrule is coupled to said opto-electronic component, said optical fiber and said portion of said circuit carrier; and
  wherein said pigtailed opto-electronic module is interfaced to a bit-line of said optical bus, and said opto-electronic component is selected from the group consisting of an optical transmitter and an optical receiver or combination thereof.

20. The system of claim 19, further comprising:
an integrated combination of components selected from the group consisting of a digital-information processor comprising a plurality of components integrated with said optical bus and said pigtailed opto-electronic module wherein said optical bus and said pigtailed opto-electronic module are to transfer information between one component and another component coupled to said optical bus in said digital-information processor, and a data-processing center comprising a plurality of digital-information processors wherein said optical bus and said pigtailed opto-electronic module are to transfer information between one digital-information processor and another digital-information processor coupled to said optical bus in said data-processing center.

* * * * *